United States Patent [19]

Jones et al.

[11] 3,957,477

[45] May 18, 1976

[54] CONTROL SYSTEMS FOR CYCLIC PROCESSES

[75] Inventors: Stanley Peter Jones, Doncaster; Peter Gerald Harrison, St. Albans, both of England

[73] Assignee: Emhart (U.K.) Limited, Doncaster, England

[22] Filed: Mar. 6, 1974

[21] Appl. No.: 448,785

[30] Foreign Application Priority Data

Mar. 13, 1973 United Kingdom............... 11897/73

[52] U.S. Cl.................................. 65/158; 65/160; 65/164; 65/207; 235/151.1; 235/92 TC
[51] Int. Cl.²....................... C03B 5/38; C03B 5/30; C05B 5/00; G05B 7/00
[58] Field of Search............. 65/162, 164, DIG. 13, 65/158, 29 A, 160, 165, 207, 208, 29 R; 235/151.1, 92 TC

[56] References Cited
UNITED STATES PATENTS

| | | | |
|---|---|---|---|
| 1,898,705 | 2/1933 | Woods et al. | 65/164 |
| 3,184,725 | 5/1965 | Siegel et al. | 65/DIG. 13 |
| 3,305,341 | 2/1967 | Mumford | 65/164 X |
| 3,471,278 | 10/1969 | Griem, Jr. | 65/164 X |
| 3,531,629 | 9/1970 | Quinn | 65/DIG. 13 |
| 3,634,660 | 1/1972 | Moran | 65/158 X |
| 3,644,111 | 2/1972 | Becker | 65/158 |
| 3,762,907 | 10/1973 | Quinn et al. | 65/164 |
| 3,767,374 | 10/1973 | Iacovazzi et al. | 65/160 |
| 3,845,281 | 10/1974 | Konisi et al. | 235/92 TC |
| 3,867,122 | 2/1975 | Miller | 65/229 X |
| 3,877,915 | 3/1975 | Mylchreest et al. | 65/29 X |

FOREIGN PATENTS OR APPLICATIONS

1,079,385 8/1967 United Kingdom.................. 65/164

*Primary Examiner*—S. Leon Bashore
*Assistant Examiner*—Frank W. Miga
*Attorney, Agent, or Firm*—Laurence A. Savage

[57] ABSTRACT

A control system for a cyclic process includes a pulse generator incorporating three rotatable gears for generating pulses. A first gear having n ferromagnetic teeth is mounted on a main generator shaft for generating a train of pulses in a magnetic perception head upon rotation of the main generator shaft, and also mounted on the main generator shaft is a second gear wheel having $n + 1$ teeth. The second gear wheel drivingly engages with a third gear wheel having n teeth which is mounted for rotation on another shaft, and the second and third gear wheels each carry a ferromagnetic element movement of which past respective further magnetic perception heads causes the generation of a single pulse during each rotation of the second and third gear wheels. The train of pulses is used for driving a counter to control the sequential operations of the cyclic process, and a coincidence between the pulses generated by the second and third gear wheels is used to reset the counter and initiate a succeeding cycle of the process.

8 Claims, 7 Drawing Figures

CONTROL SYSTEMS FOR CYCLIC PROCESSES

BACKGROUND OF THE INVENTION

This invention relates to control system for cyclic processes and to apparatus for performing such processes. In this context a "cyclic process" is a process which involves a repeated series of steps, and a particular process of manufacture or treatment may involve more than one such repeated series of steps, each of which is a cyclic stage in the whole cyclic process. In the cyclic processes with which the present invention is concerned, the series of steps in each cycle of any cyclic stage is initiated in sequence under the control of a train of pulses.

In the performance of a cyclic process, handling apparatus may be provided for performing a single cyclic stage or for performing two or more cyclic stages simultaneously. There will be particularly described in this Specification a method of formation of articles of glassware from molten glass by a "press-and-blow" or "blow-and-blow" technique, both of which techniques are cyclic processes involving a plurality of cyclic stages.

In the manufacture of glassware by the press-and-blow or blow-and-blow technique on a conventional glassware forming machine, gobs of molten glass are fed in groups of one, two or three into the machine and the gobs are each subjected to a process which involves approximately twenty separate and sequential steps (performed as a plurality of cyclic stages) and which result in the formation of an article of glassware from each gob. The gobs are handled mechanically throughout the process, the handling apparatus being operated by a set of fluid-operated, usually pneumatic, pistons and cylinders. The supply of fluid to the pistons and cylinders is controlled from a block of fluid valves, each of which operates in response to the movement of a respective actuating lever. The movement of a respective actuating lever. The movement of the actuating levers is controlled by a series of cam buttons mounted upon a timing drum which is rotated continuously.

It has also been proposed to form glassware by the press-and-blow or blow-and-blow technique using conventional handling apparatus for the gobs of molten glass, but providing an electronic rather than a mechanical means for controlling the operation of the fluid valves which control the flow of fluid into the pistons and cylinders of the handling apparatus. In this glassware forming system, each of the series of approximately twenty steps in the whole cyclic process is initiated under the control of a train of electrical pulses. As in the conventional process in which the steps are initiated from a timing drum, all the approximately twenty steps are performed in each cycle of the handling apparatus (referred to herein as a process cycle), and the whole process of forming a glass article from a gob extends over at least two cycles of operation of the handling apparatus, i.e. two process cycles.

It is a general object of the present invention to provide an improved control system for a cyclic process in which the steps of each cycle are initiated under the control of a train of pulses.

It is a further object of the present invention to provide a glassware forming system in which pulses for operating an electronic control of the handling apparatus are generated in a simple and reliable manner, the rate of generation of the pulses being automatically adjustable to compensate for variations in the rate at which gobs of glass are fed from the feeder mechanism to the handling apparatus.

SUMMARY OF THE INVENTION

According to the present invention there is provided a control system for a cyclic process in which a series of steps in each cycle is initiated in sequence under the control of a train of pulses, comprising means for generating a train of pulses, a first rotor rotatable in synchronism with the pulses in the pulse train, means operable in response to the rotation of the first rotor for generating a pulse at a predetermined point during each rotating of the first rotor, a second rotor drivingly connected to the first rotor for rotation therewith at a speed different from the speed of rotation of the first rotor, means operable in response to the rotation of the second rotor for generating a pulse at a predetermined point during each rotation of the second rotor, and means responsive to a coincidence between pulses produced during the rotations of the first and second rotors for initiating a process cycle under the control of the train of pulses. The rotors may be constituted by any suitable rotatable device, conveniently rotatable wheels. The means operable in response to the rotation of the first and second rotors for generating a pulse during each rotation of the first and second rotors will each normally comprise a fixed sensor device and an element mounted on the rotor and rotatable therewith for producing a pulse in the sensor device whenever the element moves past the sensor device.

For example, the sensor device could be a photoelectric cell and the element mounted on the rotor could interrupt a beam of light falling on to the photoelectric cell whenever the element moves past the sensor device thereby producing a pulse in the photoelectric cell. Preferably, however, the sensor device comprises a magnetic perception head, and the elements are bodies of ferromagnetic material.

Conveniently, the means for generating a pulse at a predetermined point during each rotation of the first rotor and the means for generating a pulse at a predetermined point during each rotation of the second rotor both produce only one pulse for each revolution of the first and second rotors, respectively. It is possible, however, to generate two or more pulses during the rotation of the first and/or second rotors, in which case the frequency at which the coincidences between the pulses occur can be increased for a given frequency of pulses in the pulse train.

The first rotor of the control system must be rotatable in synchronism with the pulses in the pulses train. Whilst it is envisaged that a train of pulses generated separately, for example by a suitable oscillator, could be used to drive a stepping motor coupled to the first rotor, and thereby to synchronise the rotation of the first rotor to the rate of production of pulse train, preferably the means for generating a train of pulses is operable by rotation in synchronism with the rotation of the first rotor so that the pulse train is generated as a consequence of the rotation of the first rotor.

In both arrangements the speed at which each cycle of the repetitive process is executed can be altered by increasing or decreasing the rate of generation of pulses. This is achieved in the former arrangement by altering the frequency of the oscillator supplying the pulses, and in the second arrangement by altering the speed of rotation of the first rotor. This adjustment is particularly necessary in the control of repetitive processes in which the speed of execution of each cycle must be matched to the speed at which the articles or material handled in the process are presented to the handling equipment for treatment. For example, in the manufacture of glassware by the press-and-blow or the blow-and-blow techniques, the speed at which each cycle of the process is executed must be matched to the speed at which gobs of molten glass are fed into a parison mould in the handling apparatus.

We prefer to use an arrangement in which the means for generating the train of pulses is rotatable with the first rotor and conveniently comprises a fixed sensor device and a plurality of elements mounted on the same shaft as one of the rotors for rotation therewith past the sensor device (optical or, preferably, magnetic), each of the elements producing a respective pulse in the sensor device. This arrangement has the advantage that the drive for the first rotor can be coupled directly to the drive for the glass feeder mechanism so that any increase or decrease in the speed of operation of the feeder mechnaism also produces a corresponding increase or decrease in the rate of execution of the cycles of the process.

As a result, the sequencing of the various steps of the process is not time-based, as would be the case if the first rotor was driven by the pulses generated by a separate oscillator, but is based solely upon the relative phase relationships of the various steps in the cyclic process to the input of articles or material (e.g. the glass gobs) into the process. Any increases or decreases in the rate of operation of the glass gob feeder mechanism, due either to a deliberate change in the speed of operation of the feeder mechanism or to some unintentional disturbance, are automatically transferred to the rate of operation of the process so that the operation of the feeder mechanism cannot get out of step with the operation of the forming apparatus.

The means for initiating process cycles preferably includes a counter which is reset whenever there is a coincidence between the pulses produced during the rotations of the first and second rotors. In view of the fact that the pulses preduced during the rotations of the first and second rotors normally have a finite duration in time, there is a possibility that the pulses produced during the rotation of the first and second rotors will coincide on two or more successive revolutions of the first rotor. It is, therefore, desirable that a further resetting of the counter be inhibited after each resetting until a predetermined number of pulses have been countered. This number of pulses will be equal to or greater than the number of pulses produced in that number of revolutions of the first rotor required to advance in time the moment at which the pulse is produced in response to the rotation of one rotor relative to the moment at which the pulse is produced in response to the rotation of the other rotor sufficiently to avoid overlap of the pulses in time.

In order to avoid an error occurring in the counter due to the coincidence of a pulse in the pulse train with a resetting signal, each coincidence of the pulses produced in response to the rotations of the first and second rotors should occur between two successive pulses in the pulse train.

BRIEF DESCRIPTION OF THE DRAWINGS

In order that the invention may be better understood, embodiments thereof will now be described, by way of example only with reference to the accompanying drawings, in which.

In the drawings, the same or similar parts are designated by like reference numerals.

DETAILED DESCRIPTION OF THE INVENTION

Figure 1:
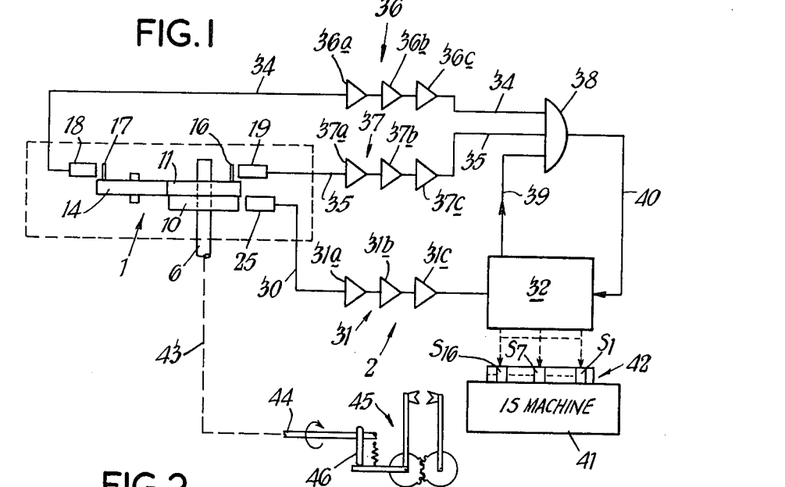
FIG. 1 is a part-schematic diagram illustrating one embodiment of the control system of the present invention.
Figure 3:
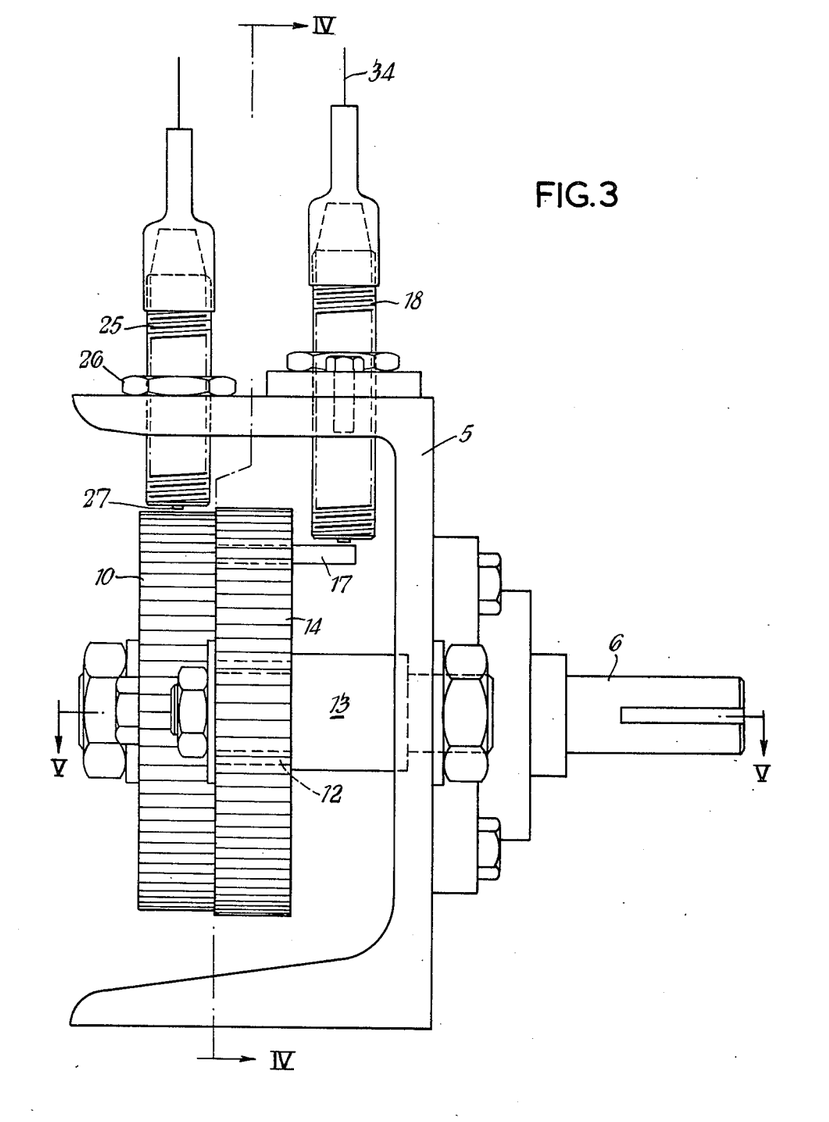
FIG. 3 is a side elevation of part of the control system illustrated schematically in FIG. 1.

Referring first to FIG. 1, there is shown schematically a preferred embodiment of the control system in accordance with this invention as used to control a glassware forming process involving either the press-and-blow or the blow-and-blow technique. The control system comprises a pulse genertor, indicated generally at 1, and an electronic circuit, indicated generally at 2, which operates in response to the electrical pulses generated by the pulse generator 1. The pulse generator 1 is illustrated in detail in FIGS. 3 to 5 of the accompanying drawings.

Figure 5:
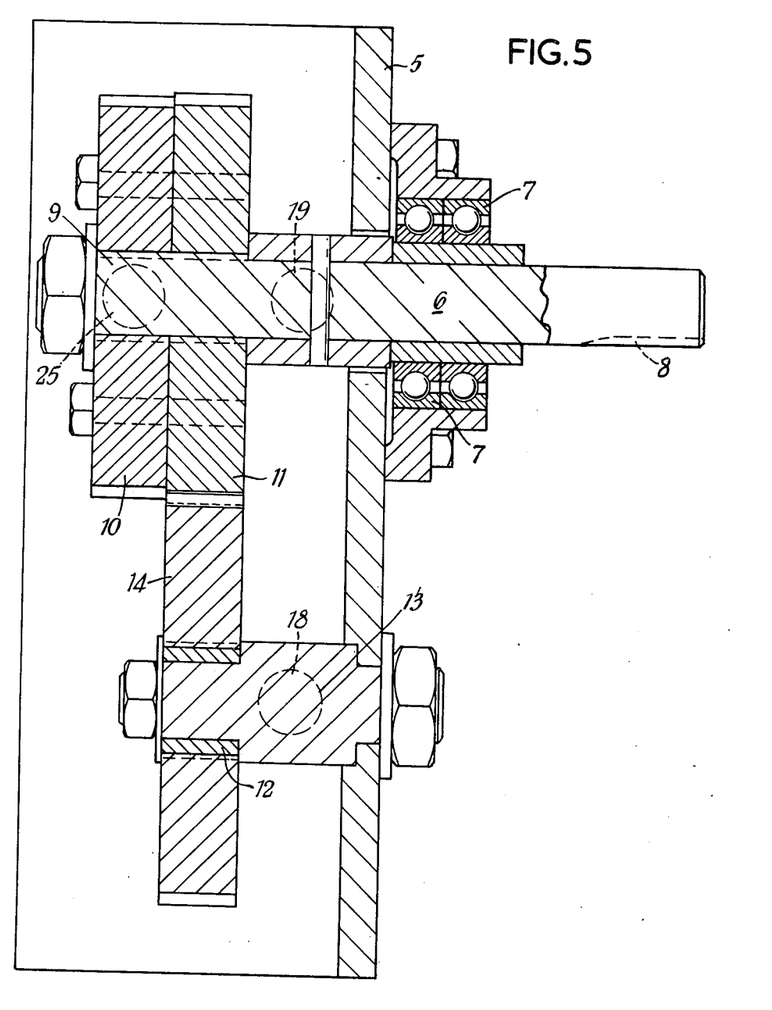
FIG. 5 is a cross-section of the part of the control system illustrated in FIG. 3 taken along the line V—V of FIG. 3.

The pulse generator 1 includes a U-shaped frame 5 in which a shaft 6 is mounted for rotation in ball-bearing races 7 (FIG. 5). Each end of the shaft 6 is splined, as shown at 8 and 9 in FIG. 5, and the splines 9, on that end of the first shaft 6 which is located within the frame 5, carry two gear wheels 10 and 11. In an alternative arrangement the gear wheels 10 and 11 are keyed to the inner end of shaft 6 rather than splined. The gear wheels 10 and 11 carry different numbers of teeth, the gear wheel 10 being provided with 60 teeth and the gear wheel 11 being provided with 61 teeth. A further gear wheel 14 having 60 teeth is also rotatably mounted in the frame 5, via a bushing 12 on a fixed pin 13 which is secured to the frame 5. The gear wheel 14 meshes with the gear wheel 11. Since the gear wheel 14 has 60 teeth compared to the 61 teeth on the gear wheel 11, rotation of the shaft 6 causes the gear wheel 14 to rotate at a greater speed than the gear wheel 11.

Figure 4:
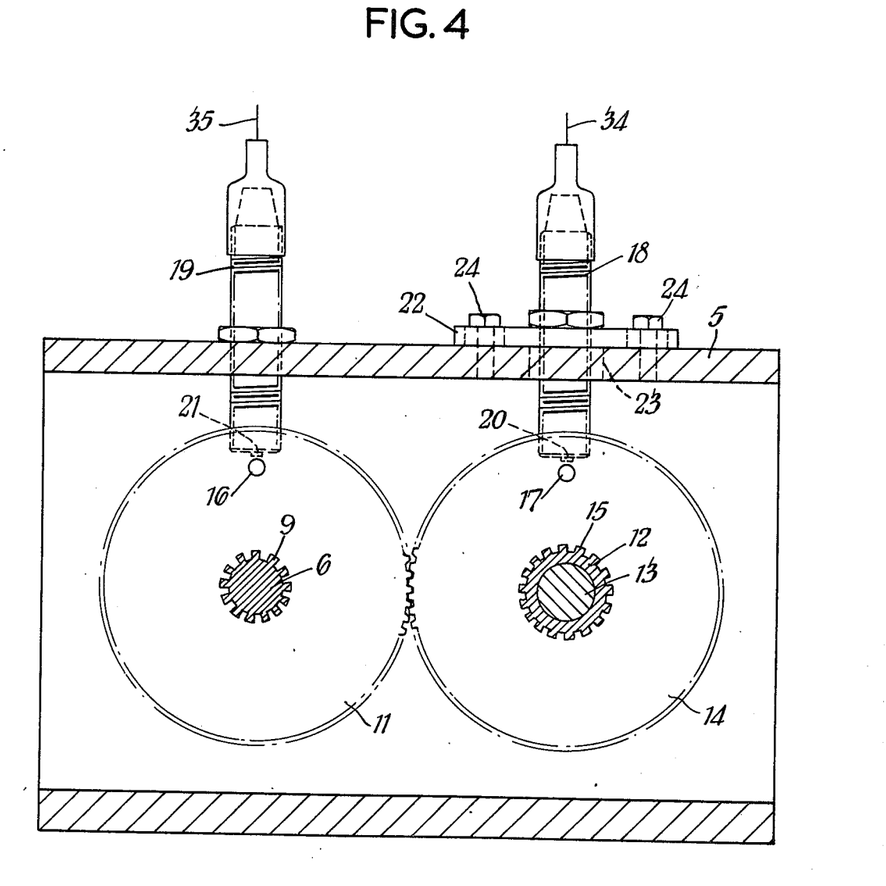
FIG. 4 is a cross-section of the part of the control system illustrated in FIG. 3 taken along line IV—IV of FIG. 3.

At best shown in FIG. 4, each of the gear wheels 11 and 14 carries a respective pin 16 and 17. The pins 16 and 17, which are of mild steel or ferromagnetic material, extend axially from the respective gear wheels 11 and 14. Two magnetic perception heads 18 and 19 are mounted in the frame 5. One perception head 19 is secured in a threaded hole in the frame 5 by a locknut. The other perception head 18 is secured by a locknut to a plate 22 and projects through an elongated slot 23 in the frame 5. The plate 22 is itself bolted to the frame 5 by bolts 24, 24 which project through respective elongated bolt-holes in the plate 22. The position of the perception head 18 on frame 25 can therefore be adjusted by loosening the bolts 24 and sliding the plate 23 over the frame 5. The sensing portions 20 and 21 of each of the perception heads 18 and 19 are located in close proximity to the paths of travel of respective ones of the pins 17 and 16. In the position shown in FIG. 4, the spacing between the sensing portions 20, 21 of the perception heads 18 and 19 and their associated pins 17 and 16 is at its minimum and is of the order of five thousandths of an inch.

A further perception head 25 (shown in FIG. 3) is also threadedly mounted in the frame 5 and is secured therein by a locknut 26. The sensing portion 27 of this further perception head 25 is located in close proximity to the teeth on the gear wheel 10, which are also of ferromagnetic material, the spacing between the teeth and the sensing portion 27 being preferably at its minimum which is of the order of five thousandths of an inch, although the spacing may be anything between 0.005 and 0.010 inches.

Figure 2:
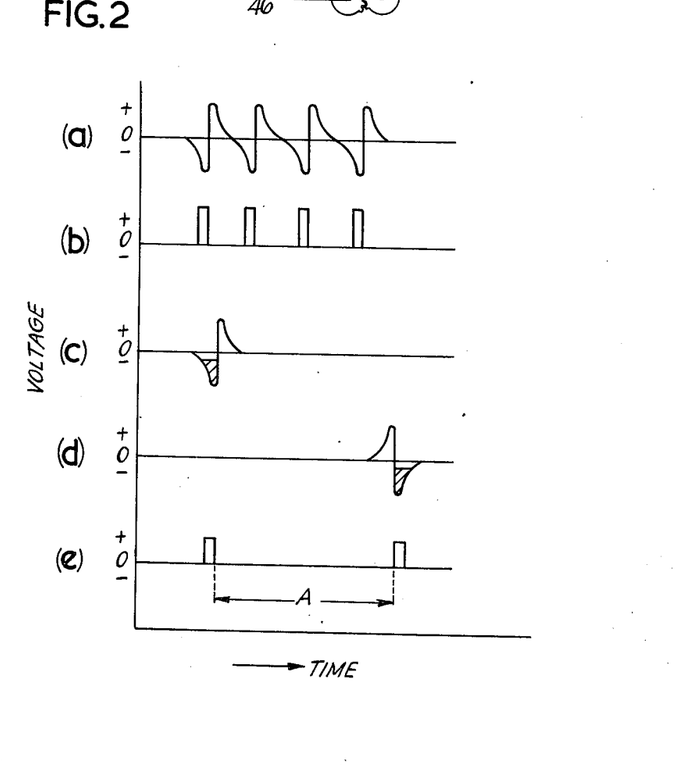
FIG. 2 illustrates the forms of the electrical signals present at various points in the control system of FIG. 1 during operation thereof.

Any conventional magnetic perception head may be used for the perception heads 18, 19 and 25, e.g. the "Miniature Perception Head" marketed by Smiths Industries Limited. one suitable form of perception head contains a permanent magnet and a solenoid coil. The movement of a ferromagnetic element towards and away from the perception heads causes changes in the magnetic flux through the solenoid coil which results in the generation of a voltage signal across the coil. Accordingly, in the operation of the embodiment of the invention which is being described, whenever either of the pins 16, 17 or any one of the 60 teeth on the gear wheel 10 moves past the sensing portion of the respective associated perception head 19, 18 or 25, an electrical pulse is generated in the perception head. Thus, when the shaft 6 is rotated, the gear wheels 10 and 11 rotate with the shaft 6 and movement of each tooth of the gear wheel 10 past the perception head 25 causes a pulse to be emitted by the perception head 25. The shapes of these pulses are illustrated in FIG. 2a. Each pulse has two portions of opposite sign corresponding respectively to the movement of one tooth of the gear wheel towards and away from the sensing portion of the perception head 25. At the centre of the pulse, which corresponds to the closest approach of the tooth to the perception head, is an almost vertical line which represents the period of change from movement of a tooth towards the perception head 25 to movement of the same tooth away from the perception head 25.

In each complete revolution of the shaft 6, 60 similar pulses will be emitted by the perception head 25 in a pulse train, as illustrated in FIG. 2a, corresponding to the movement of the 60 teeth of the gear wheel 10 past the perception head. This train of pulses is fed along line 30 (see FIG. 1) into an amplification and shaping system, indicated generally at 31. This system includes a differential pre-amplifier 31a, and amplifier 31b, and a squaring amplifier 31c each of which is conventional in construction. A series of clean square pulses is emitted from the amplification and shaping system 31, as shown in FIG. 2b, and this train of square pulses is fed into a counter 32.

Each revolution of the shaft 6 also causes the pin 16 mounted on the gear wheel 11 to move past the perception head 19 once and each time the pin 16 moves past the perception head 19, a pulse is generated in the perception head 19. Rotation of the shaft 6 also causes the gear wheel 14 mounted on the fixed pin 13 to rotate so that the pin 17 mounted on the gear wheel 14 is moved past the perception head 18 and generates an electrical pulse in the perception head 18.

The use of axially extending pins 16 and 17 to produce signals in the perception heads 19 and 18 is preferred because the perception heads 19 and 18 are then spaced axially from the teeth on the wheels 11 and 14 which, if they are of ferromagnetic material themselves, could produce output pulses in the perception heads 19 and 18. In order to eliminate this possibility entirely, it is preferred for the gear wheels 11 and 14 to be made from a non-ferromagnetic material e.g. a bonded fibrous material.

Each of the pulses generated by the perception heads 18 and 19 is passed through a respective amplification and shaping system, indicated generally at 36 and 37, which comprise differential pre-amplifiers 36a, 37a, amplifiers 36b, 37b and squaring amplifiers 36c, 37c.

The perception heads 18 and 19 are connected to their respective amplification and shaping systems 36 and 37 in opposite senses so that the pulses fed into the systems 36 and 37 from perception heads 18 and 19 are of opposite sign, the pulse derived from the perception head 18 being initially positive-going and the pulse derived from the perception head 19 being initially negative-going, as shown in FIGS. 2d and 2c respectively. This is achieved by connecting the initially positive-going and negative-going leads from the coil in perception head 19 to the non-inverting and inverting inputs of the differential amplifier 36a respectively, and the intially positive-going and negative-going leads from the coil in perception head 18 to the inverting and noninverting inputs of the differential amplifier 37a respectively.

The amplification and shaping systems 36 or 37 select only those portions of the pulses derived from the perception heads 19 and 18 indicated in cross-hatching in FIGS. 2c and 2d. As shown in FIG. 2e, the resulting pulses which emerge respectively along lines 34 and 35 are both generally square in shape. However the pulses differ in that the trailing edge of the pulse derived from that generated by perception head 19 is well-defined in time whereas it is the leading edge of the pulse derived from that generatted by perception head 18 which is well-defined in time. These well-defined edges of the squared pulses correspond to parts of the substantially vertical line at the centre of the pulses generated by the perception heads 18 and 19.

The pulses derived from the perception heads 18 and 19 pass along lines 34 and 35 into respective input terminals of an AND gate 38. A third input terminal of the AND gate is connected by a line 39 to the 3,000 output of the counter 32 for a reason which will be described later. When signals are present simultaneously in the lines 34, 35 and 39, the AND gate 38 is triggered and passes an electrical pulse along a line 40 into thhe counter 32 and this pulse is used to reset the counter 32 to zero.

In view of the fact that a step-up gear system comprising the 61 teeth gear wheel 11 and the 60 teeth gear wheel 14 is included in the drive from the shaft 6 to the gear wheel 14, eachh revolution of the first shaft 6 produces 1 1/60 revolutions in the gear wheel 14. Consequently, if the pulse generator 1 initially occupies the position shown in FIGS. 3 to 5 of the accompanying drawings, 60 complete revolutions of the first shaft 6 are required before the same relative configurations of the pins 16 and 17 are reproduced in the pulse generator 1. In this period of time 3,600 pulses will have been produced in the perception head 25 and fed into the counter 32.

Additionally, sixty pulses will have been generated in perception head 19 and 61 pulses will have been generated in perception head 18. However, only the 60th and 61st pulses generated in perception heads 19 and 18 respectively will coincide in time and will be fed into the AND gate 38 simultaneously. Since these inputs also coincide with an input from the counter 32 along line 39, which occurs after 3,000 pulses from perception head 25 have been counted, the counter 32 will be reset after 3,600 pulses derived from the perception head 25 have been counted. This sequence of events is repeated indefinitely during operation of the control system. Thus, coincidences between the pulses produced in perception heads 18 and 19 in response to rotation of gear wheels 14 and 11 are detected and in AND gate 38 and are each used to initiate a cycle of the process under the control of the train of pulses, selected ones of the pulses in each cycle of 3,600 pulses in the pulse train from perception head 25 being used to initiate respective steps in each cycle of the cyclic process.

One input of the AND gate 38 is connected by line 39 to the 3,000 count output of the counter 32 so that the AND gate 38 cannot be triggered until at least 3,000 pulses have been counted after each reset of the counter. This inhibition of the reset pulses generated by the AND gate 38 is desirable in view of the finite widths of the pulses derived from the perception heads 18 and 19. As explained previously, the trailing edge of the pulse derived from the signal generated from the perception head 19 is well-defined in time and the leading edge of the pulse derived from the signal generated by perception head 18 is well-defined in time.

The pulses generated by the perception head 18 are generated at a faster rate than the pulses generated by perception head 19 so that the time interval between the occurrence of each pulse on line 34 is less that the time interval between each pulse appearing on line 35.

At a particular stage in the cycle a pulse generated by perception head 19 will be separated from a pulse generated by perception head 18 as shown in FIG. 2e. The time interval between the well-defined trailing edge of the pulse generated by the perception head 19 and the well-defined leading edge of the pulse generated by the perception head 18 is denoted by A in FIG. 2e. At the next occurrence of a pair of pulses generated by perception heads 18 and 19 the distance A will have decreased because the pulses generated by the perception head 18 are being generated at a faster rate than the pulses generated by perception head 19. In consequence, towards the end of each series of 60 revolutions of the shaft 6 the time interval or gap A between the trailing edge of the pulse derived from the perception head 19 and the leading edge of the pulse derived from the perception head 18 is being gradually reduced to zero. However, the leading edge of the pulse derived from the perception head 18 does not overlap with the trailing edge of the pulse derived from the perception head 19 until the sixty-first and sixtieth revolutions of gear wheels 14 and 11 respectively. This coincidence is detected in the AND gate 38, because the count in the counter 32 will then be in excess of 3,000 and there will be a signal on the third input line 39.

However, on the subsequent revolution, which is the first in the next series of 60 revolutions of shaft 6, the pulse derived from the perception head 18 will be generated before that generated in the perception head 19 by an interval equal to 1/60th of the time taken for the gear wheel 11 to complete one complete revolution. If the total durations of the pulses derived from the perception heads 18 and 19 is longer than this interval, the trailing edge of the pulse derived from perception head 18 will overlap with the leading edge of the pulse derived from perception head 19 and produce simultaneous signals in the lines 34 and 35 which are connected to the AND gate 38. If there were still a signal on the third input line 39 to the AND gate 38, the counter 32 would again be reset, thereby producing an error in the control system. However, because the counter 32 has been reset to zero, there is no signal on input line 39 to the AND gate 38, and there will be no signal on this input line 39 until after 3,000 pulses have been counted in counter 32. Consequently any possibility of spurious overlaps of the signals derived from perception heads 18 and 19 triggering the AND gate 38 and thereby resetting the counter 32 is precluded. The line 39 could be connected to other numerical outputs of the counter 32, the 3,000 output being chosen for convenience and because of the proximity of the three 3,600 pulse to the end of each 3,600 pulse cycle of the counter 32. In general, the AND gate 38 should be inhibited sufficiently to avoid any possibility of overlap of the pulses derived from perception heads 18 and 19 immediately following a coincidence at the end of each cycle of 60 revolutions of shaft 6.

In order to avoid any possibility of an error developing in the counter 32 by the coincidence of a reset pulse from AND gate 38 with a pulse in the pulse train derived from perception head 25, the perception heads 18 and 19 and their associated pins 17 and 16 are so arranged relative to the perception head 25 and the teeth of the gear wheel 10 that each reset pulse from AND gate 38 occurs between two successive pulses in the pulse train. This is achieved by suitable positioning of pin 16 relative to the teeth on gear wheel 10 and by suitable adjustment, relative to the frame 5, of the position of the plate 22 which carries the perception head 18.

The counter 32, which is caused to produce a series of pulse cycles each containing 3,600 pulses, is used to control the operation of thhe handling apparatus of an I.S. glassware forming machine indicated diagrammatically at 41 in FIG. 1.

In the IS glassware forming machine 41, molten glass from a single, double or triple-orifice feeder head on a glass melting furnace is formed into groups of one, two or three gobs by a shear mechanism, one group of gobs being formed for the section of the machine in every machine cycle. Each of the gobs of molten glass severed from the stream of glass from the feeder head by the shears falls into a parison mould and is first pressed or blown into a hollow parison, and then blown into an article of glassware, by the handling apparatus of the IS machine.

Each of the approximately twenty operations of the handling apparatus of the IS machine is controlled by a fluid valve. In the glassware forming apparatus which is being described and which is controlled by the control system of FIG. 1, the valves are solenoid-operated fluid balves indicated schematically in FIG. 1.

Each pulse cycle of the counter 32 causes each of the steps in the glassware forming process to be executed once. Thus, when the machine is operating, for every pulse cycle of the counter one group of glass gobs enters the handling apparatus and one group of formed articles leaves the handling apparatus. The forming process is divided into a plurality of stages after each of which the group of partly formed articles are transferred to the following stage, leaving the previous stage free to accept another group of gobs (or partly formed articles). Several groups of glass gobs each at different stages of formation can therefore be accommodated within the machine at the same time, and, although the forming steps associated with any one stage must be executed once in each cycle of the counter 32, the passage of each group of gobs through all the individual stages of the handling apparatus may involve several cycles (for example 2½) of the counter 32.

In the embodiment of the invention which is illustrated in FIG. 1 and in which both the train of pulses and the resetting pulse are produced under the control of the shaft 6, this shaft 6 is connected through a positive mechanical coupling 43 such as a gear train to a shaft 44 which is the operating shaft of the gob feeder mechanism. The gob feeder mechanism includes gob shears 45 which are operated in conventional manner under the control of a cam 46 mounted on the shaft 44.

In this way the drive shaft 6 of the pulse generator 1 is driven by the operating shaft 44 of the gob feeder mechanism. However, the cycle of steps through which the gobs of molten glass are taken by the handling apparatus of the IS machine 41 under the control of the counter 32 is linked to the operation of the gob feeder mechanism and, particularly, the gob shears 45.

The positive mechanical coupling 43 which links the drive shaft 6 of the pulse generator 1 and the operating shaft 44 which drives the gob feeder mechanism includes a gear mechanism which produces 60 revolutions of the drive shaft 6 of the pulse generator for each cycle of operation of the counter 32 and the I.S. machine (there being one cutting operation of the gob shears 45 for each station of the I.S. machine in one cycle of operation). The positions of the wheels 11 and 14 are initially set so that the generation of a reset pulse from the AND gate 38 into the counter 32 coincides with a desired moment during the operation of the gob shears 45. The operation of the solenoid valves in the desired sequence and schedule is achieved by associating each solenoid valve 42 with a respective numerical output of the counter 32 and arranging for the solenoid valve 42 to be activated when the associated numerical output from the counter 32 is activated. For example, if the reset pulse is initially set to coincide with the moment at which the gob shears mechanism severs a gob of glass from the feeder the first of the solenoid-operated valves S1 which executes the first of the steps in the forming process may be activated when, for example, the tenth pulse in each cycle of 3,600 pulses counted by the counter 32 occurs; the seventh solenoid valve S7 may be activated when the 1432nd pulse in the cycle occurs, etc.

Any conventional electronic system may be used to actuate the solenoids in response to the appearance of a desired count in the counter 32. For example, in one suitable arrangement, each solenoid is associated with a respective digital comparator, each of which can be preset by an operator, for example by means of event thumb wheel switches, to a desired digital value corresponding to a desired moment in each machine cycle. The digital information in the counter is routed into the digital comparators and the comparators generate an output signal whenever the counter records the same digital count as the preset digital value. In practive, two such comparators will be required for each solenoid valve, one the define the start of the activation of the solenoid valve and one to define the finish of the activation. The two signals from the comparators are fed respectively as "set" and "reset" signals into a bistable switch or "flip-flop" associated with each solenoid valve. Each cycle of steps carried out by the handling apparatus is thus executed under the control of the train of pulses from the perception head 25 and the sequence of steps carried out by the handling apparatus of the forming machine is timed relative to the operation of the gob shears and the entry of a glass gob into the handling apparatus, rather than on an absolute time basis.

The execution of each step in the process is therefore maintained in a desired phase relationship to the operation of the gob shears 45. Consequently, any variations in the speed of the operation of the gob shears 45 are automatically transferred through the control system to the handling apparatus and the operation of the gob shears 45 cannot become advanced or retarded relative to the operation of the handling apparatus in the IS machine 41.

The initial setting of the actuation of the solenoid valves in the correct phase relationship to the operation of the gob shears may be achieved in a number of ways, for example a mechanical differential gear could be incorporated in the gear mechanism of the mechanical coupling 43 which lies between the drive shaft 6 of the pulse generator and the drive 44 of the gob shears 45. The presence of this differential gear will then allow thhe drive shaft 6 to be advanced or retarded relative to the gob shears 45 until the activation of the solenoids of the respective solenoid-operated valves 42 occurs in the correct phase relationship to the operation of the gob shears 45, and the gobs of glass are received in the handling apparatus at the correct moment.

Alternatively, the setting may be achieved electronically. Thus, if it is discovered that the solenoid valves 42 are each being activated fifteen pulses before the desired moment relative to operation of the gob shears 45, each of the solenoids can be arranged to be triggered 15 pulses later, for example by advancing all the settings of the event thumbwheel switches, the values of which are compared with the contents of the counter, by fifteen. More conveniently, however, an adder may be included in the control system, the contents of which are added to the contents of the counter before each comparison is made, the contents of the adder being variable by the operator, and being, in this example, minus fifteen units. The result will then be that each solenoid will be triggered 15 pulses after its schedule in the counted cycle of 3600 pulses of the counter 32, which will bring the timing of the cycles of the forming process properly into phase with the formation of glass gobs by the gob shears 45.

Since one complete cycle of operation of the glassware forming machine is thus controlled by 3,600 pulses, this set of pulses corresponds to one complete revolution of the timing drum of a conventional mechanically-operable glassware forming machine. One pulse in the train of 3600 pulses thus corresponds to a movement of the timing drum of a conventional glassware forming machine through 0.1°. Therefore, the system can control the glassware forming machine to a resolution equivalent to 0.1° of rotation of the timing drum on a mechanically controlled glassware forming machine. If a greater or lesser resolution is desired, appropriate variations must be made in the number of teeth on the gear wheels 10, 11 and/or 14 in order to increase or decrease the number of pulses produced in the pulse train between reset pulses. Alternatively, the number of pins on gear wheels 11 and 14 could be increased in order to increase the number of coincidences of signals in lines 34 and 35, and thereby to decrease the number of pulses in each cycle. It may, of course, be necessary to alter the inhibition of the AND gate 38 by the output from the counter 32 along line 39 from the 3000 count to a lower count number if the number of counts per cycle is decreased.

One particular variation in the number of pulses per cycle which it is convenient to adopt is a variation designed to match the control system to the binary requirements of electronic circuits which trigger the solenoids in response to the count in the counter. In one practical system it is advantageous to use 4096 pulses (i.e. $2^{12}$) per cycle of the process and to use these pulses to drive a counter having a count of 1024. Consequently the pulses are effectively divided by four before being fed to the counter and in practice this may be achieved by feeding the pulses to a twelve stage chain of binary devices, the first two stages of which are disregarded and the final ten stages of which are used as the counter 32 for controlling the operation of the IS machine.

One embodiment of a control system constructed to operate in this way is essentially similar to the control system described in relation to FIGS. 1 to 5 in that it involves the use of three toothed gears 10, 11 and 14 assembled in the manner already described. However, the gear wheel 10 has 64 ferromagnetic teeth so that 64 pulses are fed from the magnetic perception head 25 along the line 30 during each revolution of the shaft 6. The gear wheel 11 is provided with 65 teeth and the further gear wheel 14 has 64 teeth so that a coincidence between the pulses generated by the movements of the pins 16 and 17 past their respective perception heads 19 and 18 occurs once in every 64 revolutions of thhe shaft 6, that is to say once for every 4096 pulses generated by the rotation of the toothed gear wheel 10.

As already explained, the pulse train produced by the amplification and shaping system 31 in line 30 is effectively divided by four by feeding it through a two-stage binary counter, the output from which is used to drive the counter 32, which is a ten-stage binary counter, and the IS machine.

In this embodiment of the invention, line 39 may be connected to the output from the last but one stage in the counter 32 so that a signal is present on the output line 39 when the effective count in the counter has reached 512 (that is to say after 2048 pulses have been generated by the toothed gear wheel 10) since the counter 32 was last reset.

However, in a preferred embodiment of the invention there is provided a system in which the first coincidence which occurs between pulses on lines 34 and 35 after the system has been energised is used to reset the counter 32 irrespective of the count in the counter when this first coincidence occurs. When this first coincidence has been used to reset the counter 32, subsequent coincidences are employed to reset the counter 32 only when those coincidences are received within a specific count band embracing the end of the cycle at a count of 1024, for example a count band between a count of 960 in one cycle and 4 in the succeeding cycle.

This preferred arrangement by which the first coincidence between the pulses generated in perception heads 18 and 19 is used to reset the counter 32 has the advantage that it enables the counter to be quickly synchronised so that the process is speedily enabled to operate in a controlled manner after a starting-up of the process. When the control system is energised at the commencement of the cyclic process, the counter may be energised at any count and it is therefore important to utilise the first pulse coincidence to reset the counter to zero so that any error introduced at the energisation of the counter is quickly eliminated. Once the first pulse coincidence has been utilised, however, there must be selection of the pulse coincidences which will be utilised subsequently in order to avoid false starts to subsequent cycles, and it is for this reason that a pulse band of − 64 (960) to + 4 is employed.

Figure 6:
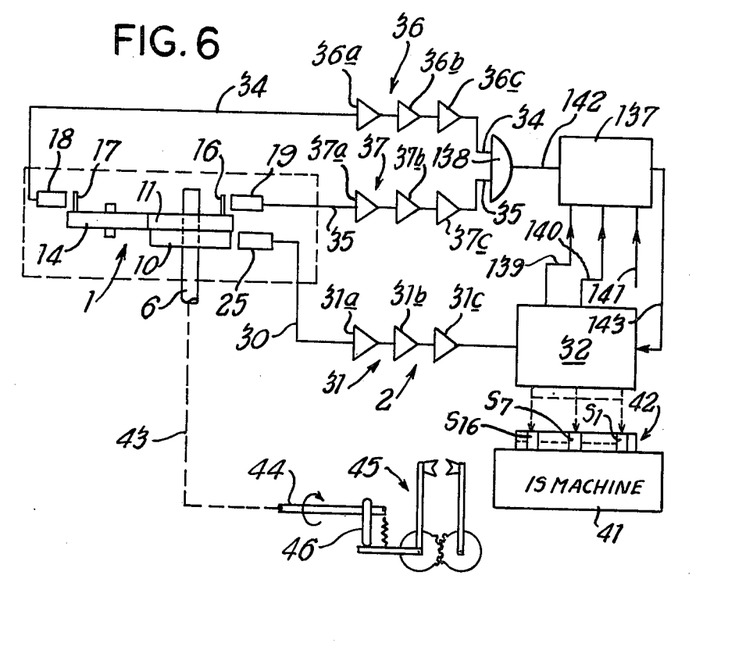
FIG. 6 is a part-schematic diagram similar to FIG. 1 but illustrating another embodiment of the control system of the present invention.

FIG. 6 shows a control system according to the present invention which is similar to the control system of FIG. 1 but modified in order to operate in the preferred manner described immediately above. The principal modification incorporated in the control system of FIG. 6 is the provision of reset logic circuitry which is indicated diagrammatically at 137 in FIG. 6.

Reset logic 137 receives a signal from AND gate 138 as a result of every coincidence between pulses generated on lines 34 and 35 respectively. Reset logic 137 also receives inputs form the counter 32 along multiple lines 139 and multiple lines 140, as well as an input along line 141 consequent upon switching-on of the control system.

When the control system is energised initially and the counter 32 starts to count in response to pulses received along line 30, a signal is immediately present on line 141. When the first coincidence between pulses 34 and 35 occurs, AND gate 138 produces an output along line 142 to the reset logic 137 and the presence of the signal on line 141 conditions the reset logic 137 to give an output upon the receipt of this first coincidence signal. A reset signal is therefore fed by the reset logic 137 along line 143 to reset the counter 32. The resetting of the counter 32 to zero in this way is used to remove the signal from line 141 so that future operation of the reset logic 137 is controlled by the receipt of coincidence signals along line 142 in conjunction with the signals which are present in multiple lines 139 and 140.

Multiple lines 139 are used to produce in the reset logic 137 a signal indicative of whether the count in counter 32 is equal to or greater than 4. The multiple lines 139 are in fact eight lines which are each connected at one end to a different one of the last eight stages in the counter 32, and at the other end to one of the eight inputs to a multiple OR gate in the reset logic 137. Signals from the last eight stages of the counter 32 (representing the eight most significant bits in the counter 32) are thus fed to the multiple OR gate which gives an output if there is a one bit in any one or more of the last eight stages of the counter 32. There is, therefore, an output from the multiple OR gate in reset logic 137 when thhe count in the counter 32 is greater than or equal to 4.

Multiple lines 140 are used to produce in the reset logic 137 a signal indicative of whether the count is the counter 32 has reached 960. The multiple lines 140 are in fact four lines which are each connected at one end to a different one of the last four stages in the counter 32 and at the other end to one of the four inputs to a multiple AND gate in the reset logic 137. The multiple AND gate gives as output when there is a one bit in all of the last four stages of the counter 32. There is, therefore, an output from the multiple AND gate in the reset logic 137 when the count in the counter 32 equals or exceeds 960.

Reset logic 137 includes further circuitry constructed to give a reset signal on line 143 on the receipt of a coincidence pulse along line 142 when either there is no output from either the multiple OR gate or the multiple AND gate (i.e. the count in the counter 32 is less than 4) or when there is an output from both the multiple OR gate and the multiple AND gate (i.e. when the count in counter 32 is equal to or greater than 960) but to give no signal upon receipt of a coincidence pulse along line 142 when there is an output from the multiple OR gate but there is no output from the multiple AND gate.

As already indicated, the presence of a signal on line 141 overrides the presence or absence of outputs from the multiple OR gate and the multiple AND gate, but the signal on line 141 is removed immediately that the counter 32 is reset for the first time after energisation of the control system, and thereafter resetting of the counter 32 is controlled by the outputs from tthe multiple OR gate and the multiple AND gate in conjunction with the presence of coincidence pulses on line 142.

In the control system described above, a single section of an IS glassware forming machine is operated under the control of the one counter 32. Advantageously, however, the counter 32 is used to control several sections of an IS glassware forming machine. Conveniently, several, for example 6 or 8, sections of an IS glassware forming machine are fed from a single feeder mechanism. The frequency of operation of the shears mechanism of the feeder is six or eight times the frequency of the forming cycle and the gobs are directed by a suitable scoop mechanism in rotation into the six or eight sections, the forming cycles of each section of the machine being maintained 60° or 45° out of phase with each other. All six or eight sections can be controlled from a single counter 32 by arranging the solenoids of each section to be triggered in exactly the same order, but 60° or 45° out of the phase with each other, i.e. 600 or 450 pulses out of phase with each other in a count cycle of 3600 pulses. A suitable gear mechanism will be required in the drive which couples the gob shears 45 to the pulse generator 1 in order to produce 60 revolutions of the input shaft 6 of the pulse generator 1 for each 6 or 8 cuts of the gob shears.

The control system which has been described above with reference to the accompanying drawings provides a simple and effective control for an cyclic process in which a series of steps in each cycle is initiated in sequence under the control of a train of pulses, the train of pulses being repeatedly divided into cycles of pulses in a simple and effective manner. The control system operates the cyclic process on an angular basis rather than on a time basis by virtue of the fact that thhe means whereby the train of pulses is generated is itself operated by the apparatus feeding the cyclic process. Consequently, the control system is automatically adjusted to alter the rate of repetition of cycles of the process to meet variations in the rate at which material or articles are presented for treatment by the process.

This feature of the embodiment of the invention which has been described, namely that the rate of repetition of the cycles of the process is automatically adjusted to be in synchronism with the rate at which material or articles are presented for treatment fy the process is a very important one. In the embodiments so far described, this feature is provided by making the shaft 44 which operates the gob shears 45 the master control shaft from which the shaft 6 of the pulse generator is driven to produce, firstly, the train of pulses which drives the counter 32, and, secondly, through the co-operation of gear wheels 11 and 14, the synchronising or resetting or cycling pulse which resets the counter 32 to zero to initiate a succeeding cycle of the process.

However, this feature of the invention may also be produced in other ways, for example, the operation of the gob feeder mechanism may be under the control of the counter 32 so that the gob feeder mechanism is a slave of the pulse generator rather than its master. Another alternative in which both thhe generation of the train of pulses which operates the counter 32 and the operation of the gob shears 45 are under the control of the rotatable shaft of a master motor will now be described with reference to FIG. 7 of the accompanying drawings.

Figure 7:
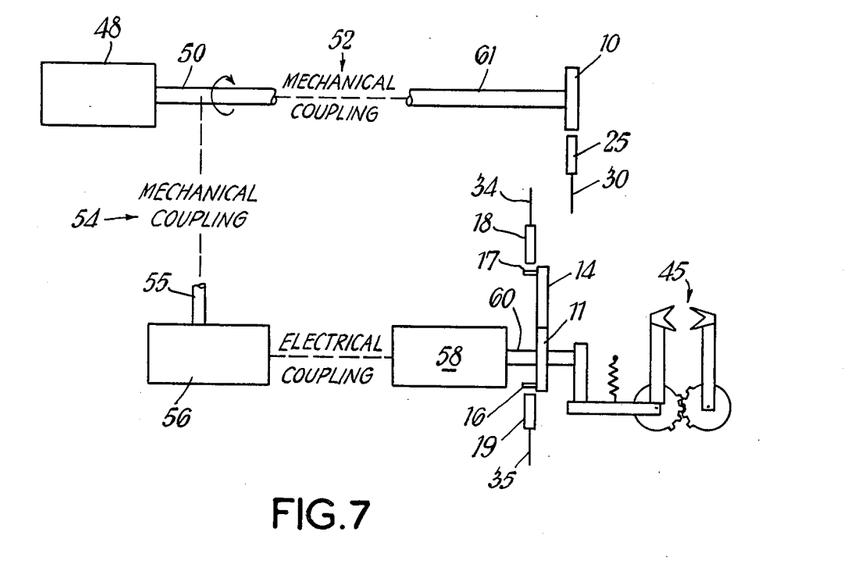
FIG. 7 is a part-schematic diagram illustrating another embodiment of the present invention.

In FIG. 7 there is shown diagrammatically an electrical motor 48 having an output shaft 50. The electrical motor 48 is the master motor and its output shaft 50 is a rotatable shaft which causes both an operating shaft 60 for the gob feeder mechanism and a shaft 61, for producing the train of pulses to drive the counter 32, to be operated in synchronism.

The output shaft 50 of the electrical motor 48 drives the shaft 61 through a mechanical coupling 52 which is a positive drive coupling such as a gear mechanism. Alternatively, the shaft 61 could be an extension of the output shaft 50 so that effectively the shafts 50 and 61 are the same shaft. The shaft 61 is the main drive shaft of a pulse generator, in that it carries the toothed gear wheel 10 which generates the train of pulses by movement of the teeth on the gear wheel 10 past the magnetic perception head 25 during rotation of the shaft 61 and the toothed wheel 10.

Another mechanical coupling 54 transfers the drive positively from the output shaft 50 to an input shaft 55 of a Selsyn transmitter 56. (Selsyn systems consisting of a transmitter and one or more receivers are obtainable from AEI-GEC). The Selsyn transmitter 56 is electrically coupled to a Selsyn receiver 58 in known manner so that the output shaft 60 of the Selsyn receiver 58 is driven in synchronism with the input shaft 55 of the Selsyn transmitter and the output shaft 50 of the motor 48. As already stated, the output shaft 60 of the Selsyn receiver 58 is the shaft which operates the gob feeder mechanism which includes the gob shears 45. In a simple arrangement the mechanical coupling 54 could be dispensed with and the input shaft 55 of the Selsyn transmitter 56 could be an extension of the output shaft 50 of the motor 48. In all cases, however, the generator of the pulse train and the gob shears mechanism are both operated under the control of the same rotatable shaft which is the output shaft of the motor 48.

In the embodiment of the invention which is being described with reference to FIG. 7, the output shaft 60 carries the gear wheel 11 which engages with the gear wheel 14. The gear wheels 11 and 14, through the pins 16 and 17 which extend axially from them, generate the resetting pulse for the counter 32 in the manner already described with reference to FIGS. 1 to 5 of the drawings.

The shaft 60 which is the operating shaft of the feeder mechanism thus controls the resetting of the counter 32 which is driven by the pulse train generated as a result of rotation of the shaft 61. In this embodiment of the invention, therefore, it is also ensured that the speed of execution of each cycle of the glassware forming process is matched to the speed at which the gobs of glass are handled in the IS machine.

We claim:

1. Apparatus for performing a cyclic process, comprising handling apparatus for performing the steps of the process, a feeder mechanism including an operating shaft for feeding material or articles to be processed to the handling apparatus, a counter for controlling the performance by the handling apparatus, in timed relation, of the steps which comprise a process cycle, a rotatable generator shaft, means operatively connecting the generator shaft and the operating shaft of the feeder mechanism so that, during operation of the apparatus, the shafts are rotated at rates proportional to one another, means controlled by the generator shaft for generating a continuous train of pulses upon rotation of the generator shaft, means for feeding the continuous train of pulses to the counter to drive the counter, and resetting means for resetting the counter to initiate the performance of a process cycle by the handling apparatus, said resetting means comprising a first rotor operably connected to and rotatable under control of the generator shaft in synchronism with the continuous pulses in the pulse train, means disposed on the first rotor for generating a first rotor pulse during each rotation of the first rotor, a second rotor, means drivingly connecting the second rotor to the first rotor for rotation therewith at a speed different from the speed of rotation of the first rotor, means disposed on the second rotor for generating a second rotor pulse during each rotation of the second rotor, and means responsive to a coincidence between first rotor and second rotor pulses produced during the rotations of the first and second rotors for applying a resetting pulse to reset the counter.

2. Apparatus as defined in claim 1, wherein both the means for generating a continuous train of pulses and the first rotor are disposed on the generator shaft for rotation with the generator shaft.

3. Apparatus as defined in claim 2, wherein the second rotor is directly engaged by the first rotor and driven thereby and wherein the second rotor has $n$ gear teeth and the first rotor has $n + 1$ gear teeth.

4. Apparatus as defined in claim 3, wherein the means controlled by the generator shaft for generating a train of pulses comprises a gear wheel operatively connected to the generator shaft and having $n$ ferromagnetic gear teeth.

5. Apparatus as defined in claim 1, wherein the means for resetting the counter includes output means from said counter and an AND gate to which there are fed the pulses produced during the rotations of the first and second rotors and an output from the counter when the counter has reached a predetermined count in a cycle.

6. Apparatus as defined in claim 1, wherein the means for resetting the counter includes and AND gate for recognizing a coincidence between pulses produced during the rotations of the first and second rotors and a reset logic circuit for inhibiting the resetting of the counter as a result of said coincidence except when the coincidence is the first coincidence detected after energization of the counter or when the count in the counter lies within a predetermined band encompassing the predetermined count which defines one cycle of the operation of the handling apparatus.

7. Apparatus as defined in claim 1, wherein the means for generating pulses during each rotation of the first and second rotors comprise ferromagnetic elements disposed respectively on the first and second rotors and fixed magnetic perception heads disposed for detecting movement of the respective ferromagnetic elements past the said magnetic perception heads during rotation of the first and second rotors.

8. Apparatus as defined in claim 1, wherein the means for generating a train of pulses comprises a toothed wheel disposed on the generator shaft and having ferromagnetic teeth, and a magnetic perception head for detecting the movement of the ferromagnetic teeth during rotation of the generator shaft.

* * * * *

PO-1050
(5/69)

UNITED STATES PATENT OFFICE
CERTIFICATE OF CORRECTION

Patent No.  3,957,477            Dated  May 18, 1976

Inventor(s)   Stanley Peter Jones and Peter Gerald Harrison

It is certified that error appears in the above-identified patent and that said Letters Patent are hereby corrected as shown below:

Col. 1,
- line 26 — --blow or blow-and-blow-- should be --blow" or "blow-and-blow"
- line 32 — --result-- should be --results--
- line 39 — delete --The movement of a re- --
- line 40 — delete --spective actuating lever.--
- line 45 — --press-and-blow or blow-and-blow-- should be --"press-and-blow" or "blow-and-blow"--
- line 57 — --process cycle-- should be --"process cycle"--

Col. 2, line 53 — --pulses train-- should be --pulse train--
- line 58 — insert after "production of" --pulses in the--

Col. 3, line 54 — --countered-- should be --counted--

Col. 4, line 33 — --press-and-blow-- should be --"press-and-blow"--
- line 34 — --blow-and-blow-- should be --"blow-and-blow"--
- line 59 — --At-- should be --As--

Col. 6, line 59 — --thhe-- should be --the--
- line 64 — --eachh-- should be --each--

Col. 8, line 27 — delete --3,600-- first occurrence and insert --thousandth--
- line 59 — --thhe-- should be --the--
- line 68 — --balves-- should be --valves--

Col. 10, line 37 — --thhe-- should be --the--

Col. 12, line 65 — --thhe-- should be --the--
- line 68 — --is-- should be --in--

- line 6 — --as-- should be --an--
- line 29 — --thhe-- should be --the--
- line 58 — --an-- should be --any--
- line 64 — --thhe-- should be --the--

Col. 14, line 7 — --fy-- should be --by--
- line 23 — --thhe-- should be --the--

Signed and Sealed this

Ninth Day of November 1976

[SEAL]

Attest:

RUTH C. MASON
Attesting Officer

C. MARSHALL DANN
Commissioner of Patents and Trademarks